Oct. 30, 1962 W. F. MARKLEY ET AL 3,061,667

TELEGRAPH POLE LINE INSULATOR

Filed Feb. 10, 1960

INVENTORS
W. F. MARKLEY
J. L. SLATER
BY
M. J. Reynolds
ATTORNEY 3,061,667
TELEGRAPH POLE LINE INSULATOR William F. Markley, Ridgewood, and James L. Slater, Glen Rock, N.J., assignors to The Western Union Telegraph Company, New York, N.Y., a corporation of New York Filed Feb. 10, 1960, Ser. No. 13,676
9 Claims. (Cl. 174—211)

This invention relates generally to electrical insulators, and more particularly to pole line insulators for use with high frequency open wire telegraph and telephone carrier service. The invention herein represents an improvement over insulators of the character disclosed and claimed in U.S. patents to Smith and Wheeler, No. 2,218,497, issued October 15, 1940, and No. 2,304,483, issued December 8, 1942.

The signaling currents employed in communication circuits, and particularly high frequency carrier circuits, are small in amplitude, and a considerable portion of each signal pulse transmitted is required for operating the receiving apparatus, such as relays in telegraph and telephone circuits. Repeaters are employed at convenient locations, but in certain instances the repeater points are necessarily spaced considerable distances apart and the signals reaching the receiving apparatus may become considerably attenuated. Since the margin of operation on communication circuits under favorable conditions is relatively small, any substantial loss of signaling current due to line leakage or other causes seriously interferes with the normal operation of the system. Moreover, communication circuits frequently are disposed along highways and railroad right of ways in connection with other signaling and power lines, and are subject to interference therefrom, and a considerable portion of the signaling current is required to override the transient or interfering currents set up therein because of such adjacent signaling and power lines, and this further reduces the operating margin of the communication signals.

In insulators of the character disclosed herein there are two electrical resistance effects that have a bearing on the electrical performance of the circuit. One of these effects is determined from the dissipation factor of the insulator material itself and is substantially constant in all kinds of weather. The other effect on the attenuation of the circuit, particularly in the higher frequency ranges, is caused by films which form on the surfaces of the insulators, due to dust, soluble salts, fine metallic particles, acid-forming films of various concentrations, sulphur fumes, and oily films and the like. The resistance of such films is, in effect, in series with the capacitance of the insulator, and the effect of these films on attenuation is limited by the capacitance of the insulator; with low capacitance the leakage current through the films is reduced with corresponding reduction in line attenuation losses. Thus, the films tend to have a marked effect on the attenuation of the circuit so that insulators of prior types would exhibit a wide change in resistance values with varying weather conditions, and particularly between dry and wet conditions. These effects ordinarily required continual checking and adjustment of amplifier equipment in the circuits and sometimes required much closer spacing of amplifiers in order to maintain adequate transmission efficiency under adverse weather conditions. Since the deleterious effects of the resistance films is limited by the capacitance of the insulator, the lower the capacitance the smaller will be the effect of the resistance films and hence result in smaller variations respectively in periods of dry and wet weather conditions.

Pole line insulators form ideal targets for malicious persons who throw stones and missiles or shoot at them, and hence it is important that an insulator have non-breakable characteristics since if an insulator is broken it enables dirt or other foreign matter carried by the elements to collect in the cracks or broken portion and this forms a conducting leakage path over the surface of the insulator, particularly in rainy or humid weather, and if a portion of the skirt or petticoat of the insulator is broken away this reduces the length of the leakage path of the insulator with the result that the insulator loses its desired insulation value. Moreover, when insulators are cracked or broken, there is a tendency for them to be pulled or to fly off the pins on which they are supported, and the line wire carried by the loose insulator may ground on the cross-arm or swing into an adjacent wire, thus either grounding or short-circuiting the communication circuit or causing the same to be crossed with an adjacent circuit.

A further important consideration is to cause the surface of the insulator to have non-wetting characteristics thereby to prevent surface leakage during periods of rain, fog and high humidity.

Insulators in accordance with the foregoing patents were substantially composed of a soft vulcanized rubber compound including a waxlike substance compounded therewith to cause the surface of the insulators to exhibit high interfacial tension with water to produce the desired non-wetting surface characteristics, and operated satisfactorily in service where the carrier frequencies were in general below 30 kilocycles. More recently, with the increased demand for communication facilities, equipment has been developed to provide a marked increase in the operating efficiency of open wire carrier circuits at frequencies up to and exceeding 100 kilocycles. In this higher frequency range, the electrical characteristics of the pole line insulators play a highly important part in maintaining circuit efficiency, and the electrical characteristics of the insulators of the foregoing patents proved to be inadequate in this higher range.

Insulators are also subject to other effects; for example, in hot humid regions there is a tendency for molds or other fungus to develop on the exposed surfaces of the insulators and this appreciably reduces the electrical insulating properties of the insulators. Preferably, the composition of the instant insulator includes a suitable fungicide to obviate this difficulty.

An object of the instant invention is to provide an insulator of the character disclosed, which exhibits improved elasticity and resiliency, particularly at the wire groove portion, to absorb sustained vibration and to prevent the formation of bends of abrasions in the line wire ordinarily caused by the stress imposed thereon by the tie wire and by swinging of the wire spans in service, and thus obviate the likelihood of breakage of the wire due to vibration and to such bends or abrasions.

A further object of the invention is to provide a non-breakable pole line insulator which has higher non-wetting surface characteristics, and which causes the line to have extremely low attenuation losses at carrier frequencies up to and exceeding 100 kilocycles.

A further object is an insulator of the character disclosed and including a compound that inhibits the growth of fungus on the exposed surfaces of the insulator.

Other objects and advantages will appear from the following detailed description taken in connection with the accompanying drawings in which.

Figure 1:
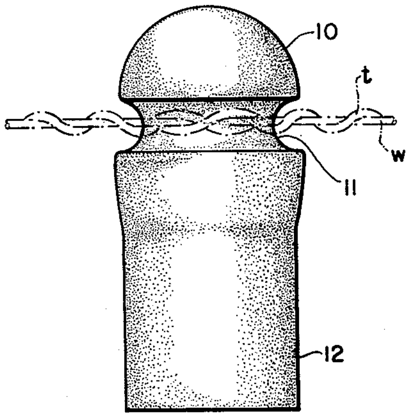
FIG. 1 is a view in elevation of a communication type insulator compounded in accordance with the instant invention.
Figure 2:
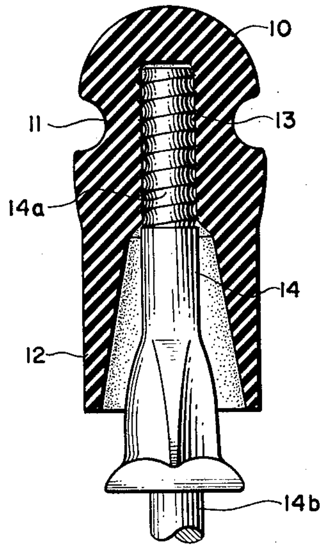
FIG. 2 is a longitudinal section of FIG. 1 showing the manner in which the insulator may be mounted on a metal supporting pin.

Referring to FIGS. 1 and 2, there is shown a communication type insulator compounded in accordance with the instant invention, the insulator having a crown portion 10, a wire groove portion 11 for receiving the line wire *w* and tie wire *t*, a reentrant skirt or petticoat portion 12, and as seen in FIG. 2 a pin hole 13 for receiving the threaded portion 14*a* of a metal insulator supporting pin 14 which is secured, by a reduced portion 14*b* thereof, to the crossarm of a pole line in known manner.

Figure 3:
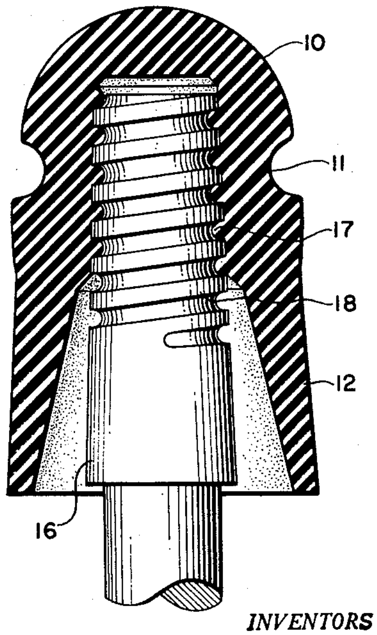
FIG. 3 shows a form of the insulator in accordance with the invention, adapted to be mounted on a wooden cob or wooden pin.

As shown in FIG. 3, the insulator may be made so that its pin hole is sufficiently large to accommodate the conventional wooden pin or cob 16, so that it is unnecessary to change the pins on an existing circuit in order to replace the insulator therein with insulators in accordance with the present invention. Due to the resiliency and elasticity of the insulator the threaded portion 17 thereof grips the threads 18 of the cob and prevents loosening and unscrewing of the insulator in service.

Figure 4:
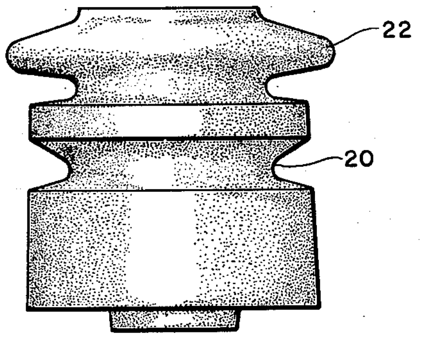
FIG. 4 shows a form of insulator in accordance with the invention, adapted for mounting on a line wire spacer bracket or a transposition bracket.
Figure 5:
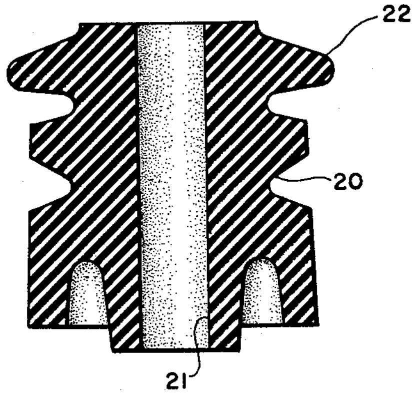
FIG. 5 is a longitudinal section of FIG. 4.

FIGS. 4 and 5 show an insulator in accordance with the present invention adapted for mounting on a line wire spacer bracket or a transposition bracket. The line wire groove in the insulator is indicated at 20, and the insulator has a pin hole 21 for receiving the pin of the spacer bracket or transposition bracket. A flanged portion 22 increases the length of the leakage path over one end of the insulator; the other end has a petticoat portion for a similar purpose.

The losses in signaling current occasioned by line insulators are in general due to three causes: First, the leakage from the line conductor, including its tie wire, over the outer surface of the insulator and under its skirt or petticoat to the supporting insulator pin; second, the leakage from the line conductor and tie wire through the material of the insulator to the insulator pin; and third, and most important when dealing with high frequency carrier current, the dielectric and dissipation losses introduced by the insulator.

In accordance with the instant invention, the composition of the material of which the insulator is composed includes one or more suitable elastomeric rubber compounds, either natural or synthetic, for example, natural rubber, isobutylene diolefin copolymer (commonly referred to as a butyl rubber), buna-S or SBR (butadiene styrene copolymer) and the like; one or more suitable polymers or copolymers, preferably hydrocarbon polymers, for example, polyethylene, polystyrene, polypropylene, polybutylene and the like; and including other substances for reinforcing, filling, coloring, softening, vulcanizing, and as age-resistors and accelerators, and preferably a fungicide, some of such other compounding substances including silica, clay, carbon, zinc oxide, wax, amine antioxidants, carbon black, tetramethyl thiuram disulphide, benzothiazol disulphide, sulphur and calcium aluminum silicate.

The polymers and copolymers above mentioned and particularly the hydrocarbon polymers, have very low dielectric constants, and hence, in combination with the elastomeric hydrocarbon and the other compounding substances assist in reducing the dielectric constant of the insulator, and hence the capacitance of the insulator is very low. The elastomeric component of the formulation is sufficient to give the insulator the necessary elasticity and resilience to prevent deformation and support a line wire in proper position, and also prevent the occurrence of bends and abrasions in the line wire. The polymers or copolymers cause the insulator to have the desired increased high surface tension with water and consequently greatly improved non-wetting characteristics as compared with the previous rubber insulators referred to.

An extremely important characteristic of the instant insulators lies in the fact that after exposure to the elements for a considerable period of time, the resiliency and elasticity of their formulations shows an increase in these properties of from 42% to 62% over the compounds of the insulators disclosed in the above-mentioned patents. Furthermore, formulations composed of the ingredients referred to herein have shown practically no change in the elasticity and resiliency after a long period of exposure to the elements, whereas the formulations referred to in the previous patents show a decrease in elasticity and resiliency of approximately 40% during the same period of exposure, as shown by the following table of measurements:

| | Elongation at Rupture | |
|---|---|---|
| | Before Exposure, percent | After Prolonged Exposure, percent |
| Isobutylene diolefin copolymer and polyethylene formulation of instant insulator | 295 | 302 |
| Buna-S or SBR and polyethylene formulation of instant insulator | 296 | 265 |
| Buna-S or SBR Stock of Insulators of patents referred to | 297 | 186 |

The amount of the elastomeric rubber compound relative to the amount of the polymers, such as the hydrocarbon polymers, may vary within considerable limits depending upon the particular polymer employed, for example, from a minimum of 20% to a maximum of 50% by weight of the final homogeneous mixture comprising the insulator.

Polystyrene, polypropylene and polybutylene when compounded in whole or in part with buna-S or SBR or the butyl component in accordance with the instant invention will be found to exhibit the same advantages from the standpoint of elasticity and resiliency, as well as providing the equivalent electrical characteristics, and this is likewise true when natural rubber is employed as the elastomeric component in the formulation. The polymers also assist in giving the insulator surface the desired high interfacial tension with water to improve the non-wetting characteristics.

The amount of the hydrocarbon polymer relative to the amount of the elastomeric component may vary within considerable limits, depending upon the particular kinds of compounds employed, for example, from a minimum of 5% to a maximum of approximately 25% by weight of the final homogeneous mixture comprising the insulator, depending upon the type and amount of the elastomeric rubber employed in the mixture. If the amount of the hydrocarbon polymer is too high or if its molecular weight is too low the insulator will be too plastic; on the other hand if the amount of the hydrocarbon polymer is too low there is a detrimental effect on the non-wetting characteristics. If a polymer such as polyethylene is employed, it may be a polyethylene of a suitable molecular weight or a mixture of polyethylenes of different molecular weights to give the desired average molecular weight.

The molecular weight and/or the amount of the hydrocarbon polymer relative to the composition of the completed insulator may readily be determined empirically and should be such that a Shore Durometer hardness "C" scale reading of the resultant mixture, when cured, lies in the range of from approximately 75 to approximately 95. The plasticizers, fillers and accelerators are embodied in the final mixture in relatively small quantities and are used primarily for the purpose of maintaining in field service the desired stiffness and hardness of the insulator in accordance with the values of hardness above mentioned.

The wax employed to cause the insulator surface to maintain the desired high interfacial tension with water in service and thus result in maintaining its non-wetting characteristics may comprise hydrocarbon waxes, including paraffin, ceresin, ozokerite, and amorphous types such as wax tailings, "mineral beeswax," and the like, vegetable waxes such as carnauba, montan, and others, and animal waxes such as stearin, stearic acid, beeswax, spermaceti, and the like. The proportions of such wax substances may vary within relatively wide limits; satisfactory results have been obtained by using two and one quarter parts by weight of a wax such as the paraffin waxes. A sufficient amount of wax must be used to cause the surface of the insulator to maintain the desired high interfacial tension with water, without employing such amount of the substance as deleteriously affects the physical and electrical properties of the insulator. The desired proportion of the wax or waxes relative to the insulator compound may well be determined empirically in each instance.

When polyethylenes are employed as the polymer it may be found desirable to use a mixture of polyethylenes some of which have a low molecular weight and others of which have a higher molecular weight, thereby preventing the polyethylene constituents from being either too soft or too hard and causing the insulator compound to be either too soft or too hard. The polymers or copolymers, such as the polyethylenes, by reason of their waxy nature, add to the effectiveness of the wax component in causing the surface of the insulator to have high interfacial tension with water and thus produce better non-wetting characteristics than is obtained with the wax component alone.

The carbon black employed to resist sun aging should be kept at a low level consistent with the property of resistance to sun aging. The amount of the carbon black has been found to be extremely important in maintaining the desired low dielectric constant, low dissipation factor and low capacitance, which are extremely necessary characteristics in an insulator for use with carrier circuits operating at frequencies in excess of 30 kilocycles. In contrast to the insulators disclosed in the prior patents referred to herein, in which the amount of carbon was present up to 10% by weight of the formulation, it has been found that the amount of the carbon black in the instant insulators should be of the order of only about 0.5% to 1.5% by weight of the formulation in order to prevent adverse effects on the electrical characteristics of the insulators. An example of carbon black is a semi-reinforcing black, referred to in the trade as SRF black, made by the furnace process. The various ingredients comprised in the formulation are throughly mixed so as to form a homogeneous mixture which is then formed into the final insulator, either by extrusion or various molding processes, and heated during or after these processes a sufficient length of time to vulcanize and cure the mixture.

An illustrative specific formulation is as follows, in which the parts of the various constituents are specified by weight:

| | Parts |
|---|---|
| Styrene butadiene rubber | 24 |
| Polyethylenes | 20 |
| Paraffin wax (to give non-wetting characteristics) | 2.25 |
| Amine antioxidants (age resistors) | 1.50 |
| Plasticizer (to provide adequate moldability) | 3 |
| Carbon black SRF type (to resist sun aging) | 1 |
| Tetramethyl thiuram disulphide (fungicide) | 0.25 |
| Benzothiazol disulphide (accelerator) | 0.10 |
| Sulphur (vulcanizing agent) | 0.15 |
| Calcium aluminum silicate (filler) | 46 |
| Zinc oxide (filler) | 1.75 |
| | 100.00 |

As is well known in the art certain of the ingredients may serve a dual purpose, for example, the zinc oxide provides reinforcement and acceleration.

Comparative tests that have been conducted on the aforementioned elastomeric compounds show that the dielectric constant of the compounds of which the instant insulator is composed has a value at one megacycle of from 3.3 to 3.8 as compared to a value of 5.9 for the compounds of the insulators of the Patents Nos. 2,218,497 and 2,304,483. Thus, from the standpoint of dielectric constant the new compounds are at least twice as good as those employed in the above mentioned patents. In regard to typical soda-lime insulator glass which is a type that is commonly specified for glass insulators for circuits in both the higher as well as the lower frequency ranges, and established as national standard by the American Society for Testing materials covered by their Specifications D–879–49, show a value of 7.5 for the dielectric constant at one megacycle.

In the case of dissipation factor, the compounds of the instant insulator at one megacycle show a value of 0.5 to 1.0 as compared with 3.9 for the compositions of the foregoing patents, and in regard to this characteristic the instant insulators are four to eight times superior to the prior type.

In regard to relative capacitance at frequencies above 30 kilocycles, formulations for the insulators compounded in accordance with the instant invention are approximately twice as good as formulations employed in the insulators of the aforesaid patents.

As hereinbefore set forth, outdoor weathering tests have demonstrated that the foregoing electrical characteristics of the instant insulator are not appreciably altered as a result of action by the sun and weather, and thus the insulator not only has improved sustained resiliency and elasticity but also possesses the necessary physical and weathering characteristics that must be attained to make the insulator suitable for open wire high frequency carrier circuits.

While there are shown and described herein certain preferred substances and embodiments which have proven adequate, various other substitutes and equivalents will doubtless be suggested to those versed in the art without departing from the invention, and the invention is therefore not limited except as indicated by the scope of the appended claims.

We claim:

1. A non-breakable insulator for supporting a line conductor, adapted to be mounted on an insulator supporting member and to maintain high insulation values at frequencies up to and exceeding 100 kilocycles over long periods of time and under adverse weather conditions, said insulator having a wire groove portion for receiving said line conductor, the body of said insulator being substantially composed of a heat-cured homogeneous mixture of at least one elastomeric rubber compound having a low dielectric constant, at least one hydrocarbon polymer having a low dielectric constant, a wax compound, and fillers and pigments including a sun-resistant agent, said elastomeric rubber compound being present in an amount sufficient to impart to the insulator the necessary elasticity and resliency to prevent deformation and support said line conductor in predetermined fixed position with respect to said insulator supporting member and said hydrocarbon polymer being present in an amount sufficient to enhance the flexibility of the insulator to an extent to prevent bending and abrasion of the line wire at the wire groove and to enhance the non-wetting surface characteristics of the insulator, said wax compound being present in an amount sufficient to cause the surface of the insulator to maintain high interfacial tension with water and provide nonwetting surface characteristics over long periods of service without detrimentally affecting the foregoing physical and electrical characteristics of the insulator.

2. An insulator according to claim 1, in which said homogeneous mixture contains a sufficient amount of a fungicide to inhibit the growth of molds or other fungus on the exposed surfaces of the insulator.

3. A non-breakable insulator for supporting a line conductor, adapted to be mounted on an insulator supporting member and to maintain high insulation values at frequencies up to and exceeding 100 kilocycles over long periods of time and under adverse weather conditions, said insulator having a wire groove portion for receiving said line conductor, the body of said insulator being substantially composed of a heat-cured homogeneous mixture of at least one elastomeric rubber compound having a low dielectric constant, at least one hydrocarbon polymer having a low dielectric constant, a wax compound, carbon black, fillers and pigments, said elastomeric rubber compound being present in an amount sufficient to impart to the insulator the necessary elasticity and resiliency to prevent deformation and support said line conductor in predetermined fixed position with respect to said insulator supporting member and said hydrocarbon polymer being present in an amount sufficient to enhance the flexibility of the insulator to an extent to prevent bending and abrasion of the line wire at the wire groove and to enhance the nonwetting surface characteristics of the insulator, said wax compound being present in an amount sufficient to cause the surface of the insulator to maintain high interfacial tension with water and provide non-wetting surface characteristics over long periods of service without detrimentally affecting the foregoing physical and electrical characteristics of the insulator, the amount of said carbon black being sufficiently small to prevent undesired increase in the electrical capacitance of the insulator but sufficient in amount to maintain adequate resistance of the insulator to sun aging.

4. An insulator according to claim 3, in which the amount of said carbon black is in the range of approximately 0.5% to 1.5% by weight of said homogeneous mixture.

5. A non-breakable insulator for supporting a line conductor, adapted to be mounted on an insulator supporting member and to maintain high insulation values at frequencies up to and exceeding 100 kilocycles over long periods of time and under adverse weather conditions, said insulator having a wire groove portion for receiving said line conductor, the body of said insulator being substantially composed of a heat-cured homogeneous mixture of at least one elastomeric rubber compound of the class consisting of natural rubber, isobutylene diolefin copolymer and butadiene styrene copolymer, at least one hydrocarbon polymer of the class consisting of polyethylene, polystyrene, polypropylene and polybutylene, a wax compound, and fillers and pigmers including a sun-resistant agent, said elastomeric rubber compound being present in an amount sufficient to impart to the insulator the necessary elasticity and resiliency to prevent deformation and support said line conductor in predetermined fixed position with respect to said insulator supporting member and said hydrocarbon polymer being present in an amount sufficient to enhance the flexibility of the insulator to an extent to prevent bending and abrasion of the line wire at the wire groove and to enhance the non-wetting surface characteristics of the insulator, said wax compound being present in an amount sufficient to cause the surface of the insulator to maintain high interfacial tension with water and provide non-wetting surface characteristics over long periods of service without detrimentally affecting the foregoing physical and electrical characteristics of the insulator.

6. An insulator according to claim 5, in which the amount of said elastomeric rubber compound is in the range of approximately 20% to approximately 50% by weight of said homogeneous mixture.

7. An insulator according to claim 5, in which the amount of said elastomeric rubber compound is approximately 24% by weight of said homogeneous mixture.

8. An insulator according to claim 5, in which the amount of said hydrocarbon polymer is in the range of approximately 5% to approximately 25% by weight of said homogeneous mixture.

9. An insulator according to claim 5, in which the amount of said hydrocarbon polymer is approximately 20% by weight of said homogeneous mixture.

References Cited in the file of this patent

UNITED STATES PATENTS

| | | |
|---|---|---|
| 2,146,596 | Schwartz et al. | Feb. 7, 1939 |
| 2,304,483 | Smith et al. | Dec. 8, 1942 |
| 2,512,459 | Hamilton | June 20, 1950 |

FOREIGN PATENTS

| | | |
|---|---|---|
| 508,338 | Canada | Dec. 21, 1954 |
| 800,128 | Great Britain | Aug. 20, 1958 |

OTHER REFERENCES

Text: Longton, Blacks and Pitches, published 1925 by D. Van Nostrand Company of New York, page 62 relied on.

Publication: Crafton et al., "A New Dielectric For Cables," Modern Plastics, July 1944, pp. 90–93.